United States Patent
Han et al.

(10) Patent No.: US 12,381,724 B2
(45) Date of Patent: Aug. 5, 2025

(54) DATA MAXIMUM/MINIMUM VALUE AGGREGATION METHOD AND SYSTEM FOR PRIVACY PROTECTION

(71) Applicants: Hangzhou City University, Hangzhou (CN); Zhejiang Ponshine Information Technology Co., Ltd., Hangzhou (CN); ZHEJIANG UNIVERSITY, Hangzhou (CN); Hangzhou Hyperchain Technology Co., Ltd., Hangzhou (CN); Zhejiang Gongshang University, Hangzhou (CN)

(72) Inventors: Song Han, Hangzhou (CN); Siqi Ren, Hangzhou (CN); Xiaoli Chen, Hangzhou (CN); Zhibo Wang, Hangzhou (CN); Liang Cai, Hangzhou (CN); Minghui Wu, Hangzhou (CN); Jinsong Han, Hangzhou (CN); Jianhong Lin, Hangzhou (CN); Shuai Zhao, Hangzhou (CN); Shudan Jin, Hangzhou (CN); Xuanxuan Xu, Hangzhou (CN); Shen Wang, Hangzhou (CN)

(73) Assignees: Hangzhou City University, Hangzhou (CN); Zhejiang Ponshine Information Technology Co., Ltd., Hangzhou (CN); ZHEJIANG UNIVERSITY, Hangzhou (CN); Hangzhou Hyperchain Technology Co., Ltd., Hangzhou (CN); Zhejiang Gongshang University, Hangzhou (CN)

( * ) Notice: Subject to any disclaimer, the term of this patent is extended or adjusted under 35 U.S.C. 154(b) by 225 days.

(21) Appl. No.: 18/128,924

(22) Filed: Mar. 30, 2023

(65) Prior Publication Data
US 2023/0318822 A1  Oct. 5, 2023

(30) Foreign Application Priority Data

Mar. 31, 2022 (CN) .......................... 202210338016.8

(51) Int. Cl.
*H04L 9/40* (2022.01)
*H04L 9/08* (2006.01)

(52) U.S. Cl.
CPC .......... *H04L 9/0869* (2013.01); *H04L 9/0825* (2013.01)

(58) Field of Classification Search
CPC .. H04L 9/0869; H04L 9/0825; G06F 21/6245
See application file for complete search history.

(56) References Cited

U.S. PATENT DOCUMENTS

| | | | |
|---|---|---|---|
| 2020/0358594 A1* | 11/2020 | Becher | H04L 9/008 |
| 2021/0143975 A1* | 5/2021 | Lakshmanan | H04L 9/0825 |
| 2022/0329438 A1* | 10/2022 | Zhang | H04L 9/0643 |

* cited by examiner

*Primary Examiner* — Thaddeus J Plecha
(74) *Attorney, Agent, or Firm* — Stephen Y. Liu; Carstens, Allen & Gourley, LLP

(57) ABSTRACT

The present disclosure provides a data maximum/minimum value (max/min) aggregation method and system for privacy protection. A Paillier cryptosystem is used to encrypt user data, so as to protect privacy and security of user health data. Further, time aggregation is implemented to help a control center obtain an overall health condition of a client in one aggregation period. By using a homomorphic property of the Paillier cryptosystem, the present disclosure implements aggregation of a max/min of privacy protection, and helps the control center obtain a max or a min of health data of the client in the aggregation period.

4 Claims, 2 Drawing Sheets

DATA MAXIMUM/MINIMUM VALUE AGGREGATION METHOD AND SYSTEM FOR PRIVACY PROTECTION

CROSS REFERENCE TO RELATED APPLICATION(S)

This patent application claims the benefit and priority of Chinese Patent Application No. 202210338016.8, filed on Mar. 31, 2022, the disclosure of which is incorporated by reference herein in its entirety as part of the present application.

TECHNICAL FIELD

The present disclosure relates to the field of privacy protection data aggregation technologies, and in particular, to a data maximum/minimum value (max/min) aggregation method and system for privacy protection.

BACKGROUND ART

Privacy protection data aggregation greatly reduces a risk of user sensitive information leakage in medical Internet of Things (IoT), and has good scalability and practicality. However, most existing privacy protection data aggregation schemes can only provide additive aggregation statistics (such as summing and averaging), but cannot provide non-additive aggregation statistics (such as a max/min and a median).

SUMMARY

The present disclosure aims to provide a data max/min aggregation method and system for privacy protection, which can provide non-additive aggregation statistics, to compensate for a prior-art disadvantage.

To achieve the above objective, the present disclosure provides the following technical solutions:

A data max/min aggregation method for privacy protection includes:
  generating, by a trusted authority, a public key (N, g) and a private key ($\lambda$, $\mu$) of a Paillier cryptosystem, exposing the public key (N, g), and sending the private key ($\lambda$, $\mu$) to a control center through a secure channel;
  encrypting, by a client, data d of the client by using the public key (N, g), generating a health data report, and uploading the health data report to a fog node, where in each aggregation period, the client uploads health data reports n times, an $i^{th}$ health data report is $c_i$, and $c_i = Enc(d_i)$;
  determining, by the fog node, whether the health data report $c_i$ received for the $i^{th}$ time is equal to a health data report $c_1$ received for a first time, where
  when the health data report $c_i$ received for the $i^{th}$ time is equal to the health data report $c_1$ received for the first time, a max/min report M of health data is the health data report $c_1$ received for the first time;
  when the health data report $c_i$ received for the $i^{th}$ time is greater than or less than the health data report $c_1$ received for the first time, obtaining, by the fog node, encrypted data Enc(1), and uploading the encrypted data Enc(1) to the control center;
  decrypting, by the control center, the encrypted data Enc(1) by using the private key ($\lambda$, $\mu$) to obtain decrypted data l, determining a value of a first generation number based on the decrypted data l, and sending the value of the first generation number to the fog node;
  when the value of the first generation number is equal to a value of a second generation number, determining, by the fog node, that the max/min report of the health data is the health data report $c_i$ received for the $i^{th}$ time, where the second generation number is a random number generated when the fog node obtains the encrypted data Enc(1);
  when the value of the first generation number is not equal to the value of the second generation number, determining, by the fog node, that the max/min report M of the health data is the health data report $c_1$ received for the first time;
  after the aggregation period ends, aggregating, by the fog node, the health data reports, to obtain an aggregated health data report C, and sending the aggregated health data report C and the max/min report M to the control center, where $C = \Pi_{i=1}^{n} c_i$, n is a total quantity of times of uploading health data reports in one aggregation period; and
  decrypting, by the control center, the aggregated health data report C and the max/min report M by using the private key ($\lambda$, $\mu$), to obtain a time aggregation result and a max/min result of the health data.

A data max/min aggregation method for privacy protection includes:
  determining whether a health data report $c_i$ received for an $i^{th}$ time is equal to a health data report $c_1$ received for a first time, where in each aggregation period, a client uploads health data reports n times, the $i^{th}$ health data report is $c_i$, $c_i = Enc(d_i)$, and $d_i$ is data generated by the client for the $i^{th}$ time;
  when the health data report $c_i$ received for the $i^{th}$ time is equal to the health data report $c_1$ received for the first time, a max/min report M of health data is the health data report $c_1$ received for the first time;
  when the health data report $c_i$ received for the $i^{th}$ time is greater than or less than the health data report $c_1$ received for the first time, obtaining encrypted data Enc(1);
  obtaining a value of a first generation number and a value of a second generation number, and determining whether the value of the first generation number is equal to the value of the second generation number, where the value of the first generation number is a value determined by a control center based on decrypted data l of the encrypted data Enc(1), and the second generation number is a random number generated when a fog node obtains the encrypted data Enc(1);
  when the value of the first generation number is equal to the value of the second generation number, determining that the max/min report of the health data is the health data report $c_i$ received for the $i^{th}$ time;
  when the value of the first generation number is not equal to the value of the second generation number, determining that the max/min report M of the health data is the health data report $c_1$ received for the first time; and
  after the aggregation period ends, aggregating the health data reports, to obtain an aggregated health data report C, where $C = \Pi_{i=1}^{n} c_i$, n is a total quantity of times of uploading health data reports in one aggregation period.

Preferably, a process of determining the encrypted data Enc(1) is:
  setting $c_i' = c_i^2 \cdot Enc(1)$ and $M' = M^2$;
  generating random numbers $r_1$, $r_2$, and $b_0$, where $$\frac{|N|}{8} < r_1 < \frac{|N|}{4},$$

$$r_2 < \frac{|N|}{8},$$

and $b_0 \in \{0,1\}$;

generating Enc(l); and if $b_0=1$, setting Enc(l)=(Enc(M')·Enc($c_i'$)$^{N-1}$)$^{r_1}$·Enc($r_2$); or setting Enc(l)=(Enc(M')$^{N-1}$·Enc($c_i'$))$^{r_1}$·Enc($r_2$), where Enc(*) indicates performing an encryption operation by using a public key, N is a total quantity of times of obtaining health data reports in an aggregation period, and the random number $b_0$ is the second generation number.

A data max/min aggregation method for privacy protection includes:

decrypting encrypted data Enc(l) by using a private key ($\lambda$, $\mu$) to obtain decrypted data l, and determining a value of a first generation number based on the decrypted data l, where the private key ($\lambda$, $\mu$) is a private key of a Paillier cryptosystem that is generated by a trusted authority, and the encrypted data Enc(l) is determined by a fog node;

when a value of a first generation number is equal to a value of a second generation number, determining, by the fog node, that a max/min report of health data is a health data report $c_i$ received for an $i^{th}$ time, where the second generation number is a random number generated by the fog node based on the encrypted data Enc(l), the health data report is obtained by a client by encrypting data d of the client by using a public key (N, g), in each aggregation period, the client uploads health data reports n times, the $i^{th}$ health data report is $c_i$, and $c_i$=Enc($d_i$); and decrypting an aggregated health data report C and a max/min report M by using the private key ($\lambda$, $\mu$), to obtain a time aggregation result and a max/min result of the health data, where the aggregated health data report C is obtained by aggregating multiple health data reports by the fog node, and the max/min report M is determined by the fog node based on the value of the first generation number, the value of the second generation number, and the health data report.

A data max/min aggregation system for privacy protection includes a trusted authority, a client, a control center, and a fog node, where the trusted authority is separately connected to the client, the control center, and the fog node, the client is separately connected to the fog node and the control center, and the fog node performs data interaction with the control center;

the trusted authority is configured to: generate a public key (N, g) and a private key ($\lambda$, $\mu$) of a Paillier cryptosystem, expose the public key (N, g), and send the private key ($\lambda$, $\mu$) to the control center through a secure channel;

the client is configured to: encrypt data d of the client by using the public key (N, g), generate a health data report, and upload the health data report to the fog node, where in each aggregation period, the client uploads health data reports n times, an $i^{th}$ health data report is $c_i$, and $c_i$=Enc($d_i$);

the fog node is configured to determine whether the health data report $c_i$ received for the $i^{th}$ time is equal to a health data report $c_1$ received for a first time; when the health data report $c_i$ received for the $i^{th}$ time is equal to the health data report $c_1$ received for the first time, a max/min report M of health data is the health data report $c_1$ received for the first time; or when the health data report $c_i$ received for the $i^{th}$ time is greater than or less than the health data report $c_1$ received for the first time, the fog node obtains encrypted data Enc(l), and uploads the encrypted data Enc(l) to the control center;

the control center is configured to decrypt the encrypted data Enc(l) by using the private key ($\lambda$, $\mu$) to obtain decrypted data l, determine a value of a first generation number based on the decrypted data l, and send the value of the first generation number to the fog node; when the value of the first generation number is equal to a value of a second generation number, the fog node determines that the max/min report of the health data is the health data report $c_i$ received for the $i^{th}$ time, where the second generation number is a random number generated when the fog node obtains the encrypted data Enc(l); or when the value of the first generation number is not equal to the value of the second generation number, the fog node determines that the max/min report M of the health data is the health data report $c_1$ received for the first time;

after the aggregation period ends, the fog node is further configured to aggregate the health data reports, to obtain an aggregated health data report C, and send the aggregated health data report C and the max/min report M to the control center, where C=$\Pi_{i=1}^{n} c_i$, n is a total quantity of times of uploading health data reports in one aggregation period; and the control center is further configured to decrypt the aggregated health data report C and the max/min report M by using the private key ($\lambda$, $\mu$), to obtain a time aggregation result and a max/min result of the health data.

According to the specific embodiments provided by the present disclosure, the present disclosure discloses the following technical effects:

The present disclosure provides a data max/min aggregation method and system for privacy protection, which can implement time aggregation and max aggregation. By using a homomorphic property of the Paillier cryptosystem, the control center can better monitor an overall health condition of a user and a condition of peak fluctuation while protecting user health data privacy.

BRIEF DESCRIPTION OF THE DRAWINGS

To describe the embodiments of the present disclosure or the technical solutions in the prior art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

DETAILED DESCRIPTION OF THE EMBODIMENTS

Figure 1:
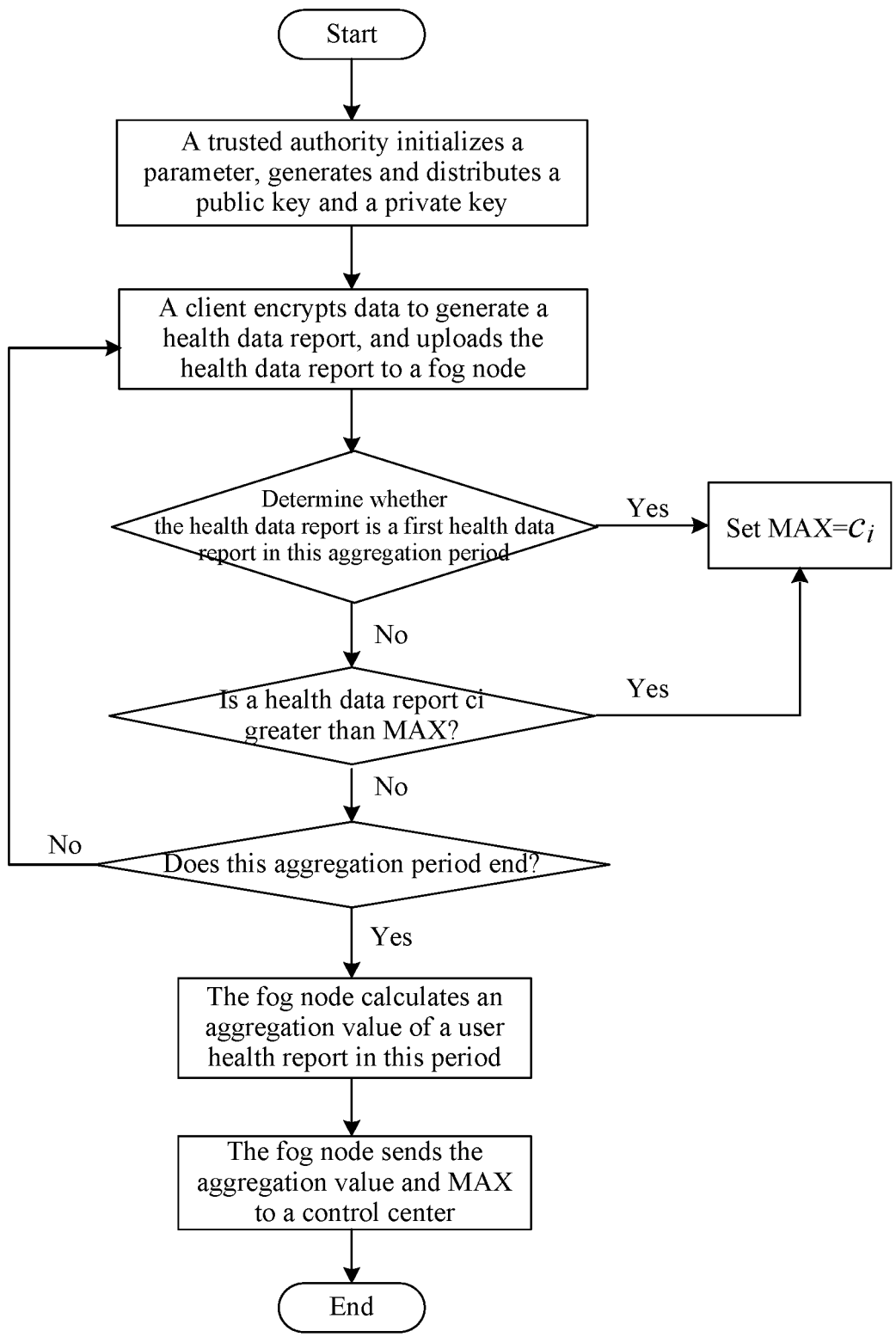
FIG. 1 is a flowchart of a data max/min aggregation method for privacy protection according to the present disclosure.

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The present disclosure aims to provide a data max/min aggregation method and system for privacy protection, which can provide non-additive aggregation statistics, to compensate for a prior-art disadvantage.

To make the above-mentioned objective, features, and advantages of the present disclosure clearer and more comprehensible, the present disclosure will be further described in detail below in conjunction with the accompanying drawings and specific embodiments.

A Paillier cryptosystem is a homomorphic encryption algorithm, and has properties of multiple addition homomorphism and single multiplication homomorphism. By using the Paillier cryptosystem, data can be calculated in a ciphertext state, and calculated data can be obtained based on one-time decryption. To help medical institutions obtain richer statistical information by using the Paillier cryptosystem, aggregation of a max/min of privacy protection should be implemented. In addition, time aggregation for health data of a client needs to be considered.

Based on this case, the present disclosure provides multiple data max/min aggregation methods and systems for privacy protection, which are specifically as follows:

A data max/min aggregation method for privacy protection includes:
  generating, by a trusted authority, a public key (N, g) and a private key ($\lambda$, $\mu$) of a Paillier cryptosystem, exposing the public key (N, g), and sending the private key ($\lambda$, $\mu$) to a control center through a secure channel;
  encrypting, by a client, data d of the client by using the public key (N, g), generating a health data report, and uploading the health data report to a fog node, where in each aggregation period, the client uploads health data reports n times, an $i^{th}$ health data report is $c_i$, and $c_i=Enc(d_i)$;
  determining, by the fog node, whether the health data report $c_i$ received for the $i^{th}$ time is equal to a health data report $c_1$ received for a first time, where
  when the health data report $c_i$ received for the $i^{th}$ time is equal to the health data report $c_1$ received for the first time, a max/min report M of health data is the health data report $c_1$ received for the first time;
  when the health data report $c_i$ received for the $i^{th}$ time is greater than or less than the health data report $c_1$ received for the first time, obtaining, by the fog node, encrypted data Enc(1), and uploading the encrypted data Enc(1) to the control center;
  decrypting, by the control center, the encrypted data Enc(1) by using the private key ($\lambda$, $\mu$) to obtain decrypted data 1, determining a value of a first generation number based on the decrypted data 1, and sending the value of the first generation number to the fog node;
  when the value of the first generation number is equal to a value of a second generation number, determining, by the fog node, that the max/min report of the health data is the health data report $c_i$ received for the $i^{th}$ time, where the second generation number is a random number generated when the fog node obtains the encrypted data Enc(1);
  when the value of the first generation number is not equal to the value of the second generation number, determining, by the fog node, that the max/min report M of the health data is the health data report $c_1$ received for the first time;
  after the aggregation period ends, aggregating, by the fog node, the health data reports, to obtain an aggregated health data report C, and sending the aggregated health data report C and the max/min report M to the control center, where $C=\Pi_{i=1}^{n} c_i$, n is a total quantity of times of uploading health data reports in one aggregation period; and
  decrypting, by the control center, the aggregated health data report C and the max/min report M by using the private key ($\lambda$, $\mu$), to obtain a time aggregation result and a max/min result of the health data.

In a specific embodiment of the present disclosure, a process of obtaining the encrypted data Enc(1) by using the fog node is as follows:
  setting $c_i'=c_i^2 \cdot Enc(1)$ and $M'=M^2$;
  generating random numbers $r_1$, $r_2$, and $b_0$, where $$\frac{|N|}{8} < r_1 < \frac{|N|}{4},$$

$$r_2 < \frac{|N|}{8},$$

and $b_0 \in \{0,1\}$;
  generating Enc(1); and if $b_0=1$, setting $Enc(1)=(Enc(M') \cdot Enc(c_i')^{N-1})^{r_1} \cdot Enc(r_2)$, or setting $Enc(1)=(Enc(M')^{N-1} \cdot Enc(c_i')) \cdot Enc(r_2)$, where
  Enc(*) indicates performing an encryption operation by using a public key, N is a total quantity of times of obtaining health data reports in an aggregation period, and the random number $b_0$ is the second generation number.

In another specific embodiment of the present disclosure, a process of the determining a value of a first generation number based on the decrypted data 1 is as follows:
  It is determined whether an absolute value of the decrypted data 1 is greater than a preset value.
  If the absolute value of the decrypted data 1 is greater than the preset value, the value of the first generation number is 1.
  If the absolute value of the decrypted data 1 is less than or equal to the preset value, the value of the first generation number is 0.

Further, a second data max/min aggregation method for privacy protection includes:
  determining whether a health data report $c_i$ received for an $i^{th}$ time is equal to a health data report $c_1$ received for a first time, where in each aggregation period, a client uploads health data reports n times, the $i^{th}$ health data report is $c_i$, $c_i=Enc(d_i)$, and $d_i$ is data generated by the client for the $i^{th}$ time;
  when the health data report $c_i$ received for the $i^{th}$ time is equal to the health data report $c_1$ received for the first time, a max/min report M of health data is the health data report $c_1$ received for the first time;
  when the health data report $c_i$ received for the $i^{th}$ time is greater than or less than the health data report $c_1$ received for the first time, obtaining encrypted data Enc(1);
  obtaining a value of a first generation number and a value of a second generation number, and determining whether the value of the first generation number is equal to the value of the second generation number, where the value of the first generation number is a value determined by a control center based on decrypted data l of the encrypted data Enc(l), and the second generation number is a random number generated when a fog node obtains the encrypted data Enc(l);

when the value of the first generation number is equal to the value of the second generation number, determining that the max/min report of the health data is the health data report $c_i$ received for the $i^{th}$ time;

when the value of the first generation number is not equal to the value of the second generation number, determining that the max/min report M of the health data is the health data report $c_1$ received for the first time; and after the aggregation period ends, aggregating the health data reports, to obtain an aggregated health data report C, where $C=\Pi_{i=1}^{n} c_i$, n is a total quantity of times of uploading health data reports in one aggregation period.

In a specific embodiment of the present disclosure, a process of determining the encrypted data Enc(l) is as follows:

setting $c_i'=c_i^2 \cdot Enc(1)$ and $M'=M^2$;

generating random numbers $r_1$, $r_2$, and $b_0$, where $$\frac{|N|}{8} < r_1 < \frac{|N|}{4},$$

$$r_2 < \frac{|N|}{8},$$

and $b_0 \in \{0,1\}$;

generating Enc(l); and if $b_0=1$, setting $Enc(l)=(Enc(M') \cdot Enc(c_i')^{N-1})^{r_1} \cdot Enc(r_2)$, or setting $Enc(l)=(Enc(M')^{N-1} \cdot Enc(c_1')) \cdot Enc(r_2)$, where Enc(*) indicates performing an encryption operation by using a public key, N is a total quantity of times of obtaining health data reports in an aggregation period, and the random number $b_0$ is the second generation number.

A third data max/min aggregation method for privacy protection includes:

decrypting encrypted data Enc(l) by using a private key ($\lambda$, $\mu$) to obtain decrypted data l, and determining a value of a first generation number based on the decrypted data l, where the private key ($\lambda$, $\mu$) is a private key of a Paillier cryptosystem that is generated by a trusted authority, and the encrypted data Enc(l) is determined by a fog node;

when the value of the first generation number is equal to a value of a second generation number, determining, by the fog node, that a max/min report of health data is a health data report $c_i$ received for an $i^{th}$ time, where the second generation number is a random number generated by the fog node based on the encrypted data Enc(l), the health data report is obtained by a client by encrypting data d of the client by using a public key (N, g), in each aggregation period, the client uploads health data reports n times, the $i^{th}$ health data report is $c_i$, and $c_i=Enc(d_i)$; and decrypting an aggregated health data report C and a max/min report M by using the private key ($\lambda$, $\mu$), to obtain a time aggregation result and a max/min result of the health data, where the aggregated health data report C is obtained by aggregating multiple health data reports by the fog node, and the max/min report M is determined by the fog node based on the value of the first generation number, the value of the second generation number, and the health data report.

In a specific embodiment of the present disclosure, a process in which the max/min report M is determined based on the value of the first generation number, the value of the second generation number, and the health data report is as follows:

It is determined whether the health data report $c_i$ received for the $i^{th}$ time is equal to a health data report $c_1$ received for a first time.

When the health data report $c_i$ received for the $i^{th}$ time is equal to the health data report $c_1$ received for the first time, a max/min report M of health data is the health data report $c_1$ received for the first time.

When the health data report $c_i$ received for the $i^{th}$ time is greater than or less than the health data report $c_1$ received for the first time, it is determined whether the value of the first generation number is equal to the value of the second generation number.

When the value of the first generation number is equal to the value of the second generation number, it is determined that the max/min report of the health data is the health data report $c_i$ received for the $i^{th}$ time.

When the value of the first generation number is not equal to the value of the second generation number, the fog node determines that the max/min report M of the health data is the health data report $c_1$ received for the first time.

In another specific embodiment of the present disclosure, a specific process of the determining a value of a first generation number based on the decrypted data l is as follows:

It is determined whether an absolute value of the decrypted data l is greater than a preset value.

If the absolute value of the decrypted data l is greater than the preset value, the value of the first generation number is 1.

If the absolute value of the decrypted data l is less than or equal to the preset value, the value of the first generation number is 0.

Figure 2:
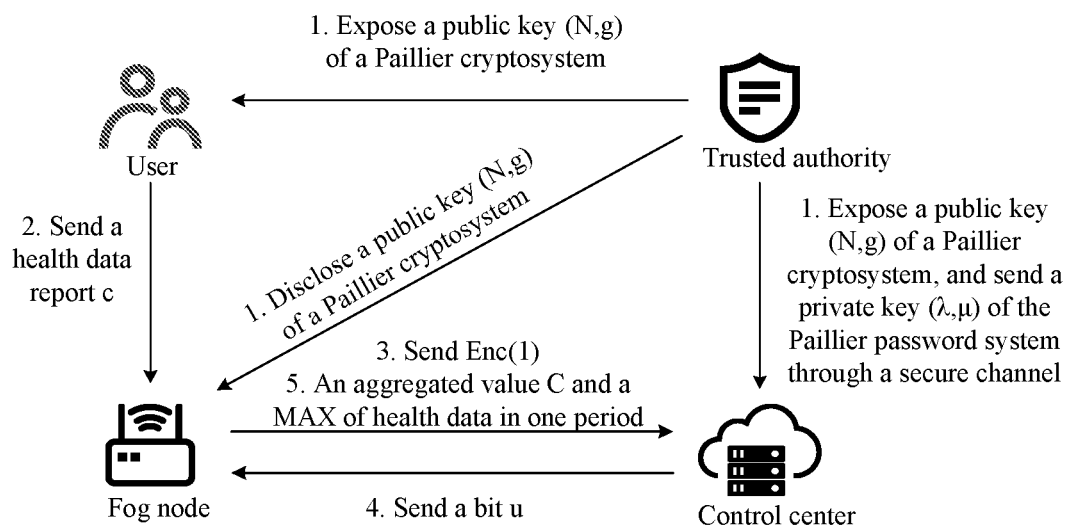
FIG. 2 is a diagram of information interaction in a data max/min aggregation system for privacy protection according to an embodiment of the present disclosure.

As shown in FIG. 2, a data max/min aggregation system for privacy protection provided in the present disclosure includes a trusted authority, a client, a control center, and a fog node, where the trusted authority is separately connected to the client, the control center, and the fog node, the client is separately connected to the fog node and the control center, and the fog node performs data interaction with the control center;

the trusted authority is configured to: generate a public key (N, g) and a private key ($\lambda$, $\mu$) of a Paillier cryptosystem, expose the public key (N, g), and send the private key ($\lambda$, $\mu$) to the control center through a secure channel;

the client is configured to: encrypt data d of the client by using the public key (N, g), generate a health data report, and upload the health data report to the fog node; where in each aggregation period, the client uploads health data reports n times, an $i^{th}$ health data report is $c_i$, and $c_i=Enc(d_i)$;

the fog node is configured to determine whether the health data report $c_i$ received for the $i^{th}$ time is equal to a health data report $c_1$ received for a first time; when the health data report $c_i$ received for the $i^{th}$ time is equal to the health data report $c_1$ received for the first time, a max/min report M of health data is the health data report $c_1$ received for the first time; or when the health data report $c_i$ received for the $i^{th}$ time is greater than or less than the health data report $c_1$ received for the first time, the fog node obtains encrypted data Enc(l), and uploads the encrypted data Enc(l) to the control center;

the control center is configured to decrypt the encrypted data Enc(l) by using the private key ($\lambda$, $\mu$) to obtain decrypted data l, determine a value of a first generation number based on the decrypted data l, and send the value of the first generation number to the fog node; when the value of the first generation number is equal to a value of a second generation number, the fog node determines that the max/min report of the health data is the health data report $c_i$ received for the $i^{th}$ time, where the second generation number is a random number generated when the fog node obtains the encrypted data Enc(l); or when the value of the first generation number is not equal to the value of the second generation number, the fog node determines that the max/min report M of the health data is the health data report $c_i$ received for the first time;

after the aggregation period ends, the fog node is further configured to aggregate the health data reports, to obtain an aggregated health data report C, and send the aggregated health data report C and the max/min report M to the control center, where $C=\Pi_{i=1}^{n} c_i$, n is a total quantity of times of uploading health data reports in one aggregation period; and the control center is further configured to decrypt the aggregated health data report C and the max/min report M by using the private key ($\lambda$, $\mu$), to obtain a time aggregation result and a max/min result of the health data.

The following uses an example to describe, based on a specific data processing procedure of existing four entities of a trusted authority, a client, a fog node, and a control center, an actual application process of the data max/min aggregation methods and systems for privacy protection provided in the present disclosure.

The trusted authority is responsible for generating system parameters and distributing a public key and a private key to other entities. The control center needs to obtain an aggregation value and a max/min of health data of the client in a period of time. This period of time is defined as an aggregation period. The fog node is responsible for acquiring data from the client, calculating and obtaining a max/min of health data of a personal client in each aggregation period, aggregating the health data of the personal client in the aggregation period, and finally reporting the two pieces of data to the control center. The client needs to upload encrypted health data report to the fog node in real time.

One aggregation period is used as an example. A specific implementation process of the foregoing provided method and system for aggregating a max/min of privacy protection for health data includes:

(1) The system parameter is initialized. The trusted authority generates a public key (N, g) and a private key ($\lambda$, $\mu$) of a Paillier cryptosystem, exposes the public key (N, g), and sends the private key ($\lambda$, $\mu$) to the control center through a secure channel.

(2) The client encrypts its own data d by using the public key (N, g), generates a health data report c=Enc(d), and uploads the health data report to the fog node. It is assumed that the client needs to upload health data reports for n times in each aggregation period, and $c_i$ is set as a report uploaded by the client for an $i^{th}$ time.

(3) After the fog node receives the report, if $c_i=c_1$, MAX=$c_1$ is recorded (if the min is required, MIN=$c_1$ is record, and where this operation is not described below, it only needs to replace MAX with MIN). Otherwise, the fog node performs the following operations:

(a) setting $c_i'=c_i^2 \cdot$Enc(1) and MAX'=MAX$^2$;

(b) generating random numbers $r_1$, $r_2$, and $b_0$, where $$\frac{|N|}{8} < r_1 < \frac{|N|}{4},$$

$$r_2 < \frac{|N|}{8},$$

and $b_0 \in \{0,1\}$;

(c) generating Enc(l); and if $b_0=1$, setting Enc(l)=(Enc(MAX')·Enc($c_i'$)$^{N-1}$)$^{r_1}$·Enc($r_2$), or setting Enc(l)=(Enc(MAX')$^{N-1}$·Enc($c_i'$))$^{r_1}$·Enc($r_2$).

(d) Enc(l) is sent to the control center.

(4) The control center decrypts Enc(l) by using the private key ($\lambda$, $\mu$) to obtain l. If $$|l| > \frac{|N|}{2},$$

a bit u=1 is generated; otherwise, a bit u=0 is generated. The control center sends u to the fog node.

(5) After the fog node obtains u, the following operations are performed: When $b_0=1$ and u=1, or $b_0=0$ and u=0, it indicates that $c_i$ is larger than MAX, and therefore, MAX=$c_i$ is set. Otherwise, MAX remains unchanged (if the min is required, when $b_0=1$ and u=1, or $b_0=0$ and u=0, MIN remains unchanged. Otherwise, MIN=c is set).

(6) After the period ends, the fog node aggregates the data of the client to generate a health data report $C=\Pi_{i=1}^{n} c_i$, and sends an aggregated health data report C and the max MAX of the health data of the client to the control center.

(7) The control center decrypts the aggregated health data report C and a max MAX report by using the private key ($\lambda$, $\mu$), to obtain a time aggregation result and a max report of patient health data.

Based on the foregoing description, the present disclosure has a max/min aggregation function. The Paillier cryptosystem protects privacy of the health data of the client. In addition, the control center can not only obtain an overall condition of medical data of a patient in a day, but also can obtain, by using max and min data, a peak change of the medical data of the patient such as blood pressure and blood sugar.

Each embodiment of this specification is described in a progressive manner, each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

In this specification, some specific embodiments are used for illustration of the principles and implementations of the present disclosure. The description of the foregoing embodiments is used to help illustrate the method of the present disclosure and the core ideas thereof. In addition, a person of ordinary skill in the art can make various modifications in terms of specific implementations and the scope of application in accordance with the ideas of the present disclosure.

In conclusion, the content of this specification shall not be construed as a limitation to the present disclosure.

What is claimed is:

1. A data maximum/minimum value (max/min) aggregation method for privacy protection, comprising:
generating, by a trusted authority, a public key (N, g) and a private key ($\lambda$, $\mu$) of a Paillier cryptosystem, exposing the public key (N, g), and sending the private key ($\lambda$, $\mu$) to a control center through a secure channel;
encrypting, by a client, health data d of the client by using the public key (N, g), generating a health data report, and uploading the health data report to a fog node, over one or more aggregation periods, wherein in each aggregation period, the client uploads health data reports n times, an $i^{th}$ health data report received for an $i^{th}$ time is health data report $c_i$, and $c_i=Enc(d_i)$;
determining, by the fog node, whether the health data report $c_i$ received for the $i^{th}$ time is equal to a health data report $c_1$ received for a first time, wherein
when the health data report c; received for the $i^{th}$ time is equal to the health data report $c_1$ received for the first time, a max/min report M of the health data is the health data report $c_1$ received for the first time;
when the health data report $c_i$ received for the $i^{th}$ time is greater than or less than the health data report $c_1$ received for the first time, obtaining, by the fog node, encrypted data Enc(1), and uploading the encrypted data Enc(1) to the control center;
decrypting, by the control center, the encrypted data Enc(1) by using the private key ($\lambda$, $\mu$) to obtain decrypted data 1, determining a value of a first generation number based on the decrypted data 1, and sending the value of the first generation number to the fog node;
when the value of the first generation number is equal to a value of a second generation number, determining, by the fog node, that the max/min report of the health data is the health data report $c_i$ received for the $i^{th}$ time, wherein the second generation number is a random number generated when the fog node obtains the encrypted data Enc(1);
when the value of the first generation number is not equal to the value of the second generation number, determining, by the fog node, that the max/min report M of the health data is the health data report $c_1$ received for the first time;
after each aggregation period ends, aggregating, by the fog node, the health data reports, to obtain an aggregated health data report C, and sending the aggregated health data report C and the max/min report M to the control center, wherein $C=\Pi_{i=1}^{n}c_i$, n is a total quantity of times of uploading the health data reports in one aggregation period; and
decrypting, by the control center, the aggregated health data report C and the max/min report M by using the private key ($\lambda$, $\mu$), to obtain a time aggregation result and a max/min result of the health data.

2. The data maximum/minimum value (max/min) aggregation method for privacy protection according to claim 1, comprising:
determining whether the health data report $c_i$ received for the $i^{th}$ time is equal to the health data report $c_1$ received for the first time, wherein in each aggregation period, the client uploads the health data reports n times, the $i^{th}$ health data report is $c_i$, $c_i=Enc(d_i)$, and $d_i$ is data generated by the client for the $i^{th}$ time;
when the health data report $c_i$ received for the $i^{th}$ time is equal to the health data report $c_1$ received for the first time, the max/min report M of the health data is the health data report $c_1$ received for the first time;
when the health data report $c_i$ received for the $i^{th}$ time is greater than or less than the health data report $c_1$ received for the first time, obtaining the encrypted data Enc(1);
obtaining the value of the first generation number and the value of the second generation number, and determining whether the value of the first generation number is equal to the value of the second generation number, wherein the value of the first generation number is determined by the control center based on the decrypted data 1 of the encrypted data Enc(1), and the second generation number is the random number generated when the fog node obtains the encrypted data Enc(1);
when the value of the first generation number is equal to the value of the second generation number, determining that the max/min report M of the health data is the health data report $c_i$ received for the $i^{th}$ time;
when the value of the first generation number is not equal to the value of the second generation number, determining that the max/min report M of the health data is the health data report $c_1$ received for the first time; and
after each aggregation period ends, aggregating the health data reports, to obtain the aggregated health data report C, wherein $C=\Pi_{i=1}^{n}c_i$, n is a total quantity of times of uploading the health data reports in one aggregation period.

3. The data maximum/minimum value (max/min) aggregation method for privacy protection according to claim 1, comprising:
decrypting the encrypted data Enc(1) by using the private key ($\lambda$, $\mu$) to obtain the decrypted data 1, and determining the value of the first generation number based on the decrypted data 1, wherein the private key ($\lambda$, $\mu$) is a private key of the Paillier cryptosystem that is generated by the trusted authority, and the encrypted data Enc(1) is determined by the fog node;
when the value of the first generation number is equal to the value of the second generation number, determining, by the fog node, that the max/min report of the health data is the health data report $c_i$ received for the $i^{th}$ time, wherein the second generation number is the random number generated by the fog node based on the encrypted data Enc(1), the health data report is obtained by the client by encrypting the health data d of the client by using the public key (N, g), in each aggregation period, the client uploads the health data reports n times, the $i^{th}$ health data report is the health data report $c_i$, and $c_i=Enc(d_i)$; and
decrypting the aggregated health data report C and the max/min report M by using the private key ($\lambda$, $\mu$), to obtain the time aggregation result and the max/min result of the health data, wherein the aggregated health data report C is obtained by aggregating the health data reports by the fog node, and the max/min report M is determined by the fog node based on the value of the first generation number, the value of the second generation number, and the health data report.

4. A data maximum/minimum value (max/min) aggregation system for privacy protection, comprising: a hardware trusted authority, a hardware client, a hardware control center, and a hardware fog node, wherein
the hardware trusted authority is separately connected to the hardware client, the hardware control center, and the hardware fog node, the hardware client is separately connected to the hardware fog node and the hardware control center, and the hardware fog node performs data interaction with the hardware control center;

the hardware trusted authority is configured to: generate a public key (N, g) and a private key (λ, μ) of a Paillier cryptosystem, expose the public key (N, g), and send the private key (λ, μ) to the hardware control center through a secure channel;

the hardware client is configured to: encrypt health data d of the hardware client by using the public key (N, g), generate a health data report, and upload the health data report to the hardware fog node over one or more aggregation periods, wherein in each aggregation period, the hardware client uploads health data reports n times, an $i^{th}$ health data report received for an $i^{th}$ time is health data report $c_i$, and $c_i = Enc(d_i)$;

the hardware fog node is configured to determine whether the health data report $c_i$ received for the $i^{th}$ time is equal to a health data report $c_1$ received for a first time; when the health data report $c_i$ received for the $i^{th}$ time is equal to the health data report $c_1$ received for the first time, a max/min report M of the health data is the health data report $c_1$ received for the first time; or when the health data report $c_i$ received for the $i^{th}$ time is greater than or less than the health data report $c_1$ received for the first time, the hardware fog node obtains encrypted data Enc(l), and uploads the encrypted data Enc(l) to the hardware control center;

the hardware control center is configured to decrypt the encrypted data Enc(l) by using the private key (λ, μ) to obtain decrypted data l, determine a value of a first generation number based on the decrypted data l, and send the value of the first generation number to the hardware fog node; when the value of the first generation number is equal to a value of a second generation number, the hardware fog node determines that the max/min report M of the health data is the health data report $c_i$ received for the $i^{th}$ time, wherein the second generation number is a random number generated when the hardware fog node obtains the encrypted data Enc(l); or when the value of the first generation number is not equal to the value of the second generation number, the hardware fog node determines that the max/min report M of the health data is the health data report $c_1$ received for the first time;

after the each aggregation period ends, the hardware fog node is further configured to aggregate the health data reports, to obtain an aggregated health data report C, and send the aggregated health data report C and the max/min report M to the hardware control center, wherein $C = \Pi_{i=1}^{n} c_i$, n is a total quantity of times of uploading the health data reports in one aggregation period; and the hardware control center is further configured to decrypt the aggregated health data report C and the max/min report M by using the private key (λ, μ), to obtain a time aggregation result and a max/min result of the health data.

\* \* \* \* \*